US009211796B2

(12) United States Patent
Nagayanagi et al.

(10) Patent No.: US 9,211,796 B2
(45) Date of Patent: Dec. 15, 2015

(54) IN-VEHICLE CONTROLLER

(75) Inventors: Keiji Nagayanagi, Okazaki (JP);
Masayoshi Kondoh, Chiryu (JP)

(73) Assignee: DENSO CORPORATION, Kariya (JP)

( * ) Notice: Subject to any disclaimer, the term of this patent is extended or adjusted under 35 U.S.C. 154(b) by 522 days.

(21) Appl. No.: 13/409,336

(22) Filed: Mar. 1, 2012

(65) Prior Publication Data
US 2012/0316714 A1 Dec. 13, 2012

(30) Foreign Application Priority Data
Jun. 13, 2011 (JP) .................................. 2011-131413

(51) Int. Cl.
| B60L 15/20 | (2006.01) |
| B60L 3/00 | (2006.01) |
| B60K 35/00 | (2006.01) |
| B60W 20/00 | (2006.01) |
| B60W 10/26 | (2006.01) |
| B60L 7/18 | (2006.01) |
| B60L 11/14 | (2006.01) |
| B60L 11/18 | (2006.01) |
| B60W 10/30 | (2006.01) |

(52) U.S. Cl.
CPC . B60L 7/18 (2013.01); B60L 11/14 (2013.01); B60L 11/1861 (2013.01); B60L 15/2045 (2013.01); B60L 2240/12 (2013.01); B60L 2240/423 (2013.01); B60L 2240/545 (2013.01); B60L 2240/549 (2013.01); B60L 2240/622 (2013.01); B60L 2250/16 (2013.01); B60L 2260/52 (2013.01); B60L 2260/54 (2013.01); Y02T 10/642 (2013.01); Y02T 10/70 (2013.01); Y02T 10/7005 (2013.01); Y02T 10/705 (2013.01); Y02T 10/7044 (2013.01); Y02T 10/7077 (2013.01); Y02T 10/7283 (2013.01); Y02T 10/7291 (2013.01); Y02T 90/16 (2013.01); Y02T 90/162 (2013.01)

(58) Field of Classification Search
CPC ............ B60L 11/1861; B60L 15/2045; B60L 2260/52; Y02T 10/642; Y02T 10/7005; Y02T 10/7044; Y02T 90/162
See application file for complete search history.

(56) References Cited

U.S. PATENT DOCUMENTS

| 2009/0160247 | A1* | 6/2009 | Nakamura et al. ............. 307/9.1 |
| 2011/0112710 | A1* | 5/2011 | Meyer-Ebeling et al. ...... 701/22 |
| 2012/0191279 | A1* | 7/2012 | Wippler ......................... 701/22 |

FOREIGN PATENT DOCUMENTS

| JP | 08-251708 | 9/1996 |
| JP | 10-248104 | 9/1998 |

(Continued)

OTHER PUBLICATIONS

Office Action (2 pages) dated Apr. 23, 2013, issued in corresponding Japanese Application No. 2011-131413 and English translation (3 pages).

Primary Examiner — Helal A Algahaim
Assistant Examiner — Charles J Han
(74) Attorney, Agent, or Firm — Nixon & Vanderhye P.C.

(57) ABSTRACT

A control device for a vehicle includes: a plurality of controllers, each of which executes a plurality of energy saving control modes for restricting reduction of driving energy of the vehicle; a selector for displaying the plurality of energy saving control modes at the same time and for prompting an user of the vehicle to select execution or rejection of one of the plurality of energy saving control modes; and a central control device for controlling one of the plurality of controllers to execute a corresponding energy saving control mode, of which the execution is selected by the user, so that a maximum cruising range of the vehicle is expanded without providing a feeling of discomfort.

18 Claims, 8 Drawing Sheets

(56) References Cited

FOREIGN PATENT DOCUMENTS

| JP | 11-187505 | 7/1999 |
| JP | 2003-267164 | 9/2003 |
| JP | 2004-147460 | 5/2004 |
| JP | 2006-113892 | 4/2006 |
| JP | 2006-151039 | 6/2006 |
| JP | 2009-005532 | 1/2009 |
| JP | 2009-171647 | 7/2009 |

* cited by examiner

| SUN | | | |
| SAT | | | |
| FRI | | | |
| THU | | | |
| WED | | | |
| TUE | | | |
| MON | | | |

| TIME ZONE(t) | DL(t) | Dth(t) | N |
|---|---|---|---|
| 0-2 | — | — | 0 |
| 2-4 | — | — | 0 |
| 4-6 | — | — | 0 |
| 6-8 | 20km | 20km | 10 |
| 8-10 | 5km | 10km | 1 |
| 10-12 | — | 15km | 0 |
| 12-14 | — | 7km | 2 |
| 14-16 | — | 15km | 0 |
| 16-18 | 20km | 20km | 8 |
| 18-20 | — | 1km | 0 |
| 20-22 | — | 5km | 0 |
| 22-24 | — | — | 0 |

IN-VEHICLE CONTROLLER

CROSS REFERENCE TO RELATED APPLICATION

This application is based on Japanese Patent Application No. 2011-131413 filed on Jun. 13, 2011, the disclosure of which is incorporated herein by reference.

TECHNICAL FIELD

The present disclosure relates to an in-vehicle controller for controlling reduction of driving energy of a vehicle.

BACKGROUND

JP-A-H10-248104 teaches a device, which limits an electric power of a rotating electric machine for driving a vehicle when a remaining electric power amount of a battery is reduced. Even after the remaining electric power amount of the battery is reduced, a driver can drives the vehicle in a distance to a safe place for parking the vehicle. Further, the battery is not damaged.

JP-A-2006-113892 teaches a device, which executes automatically a charge reservation process for making a reservation to a charge station, and executes a process for guiding a route to the reserved charge station when the remaining electric power amount of a battery is reduced. In this case, the driver can drive the vehicle to the charge station as a charging place.

In JP-A-H10-248104, when the remaining electric power amount of the battery is reduced, the driving performance of the vehicle is automatically limited. In this case, behavior of the vehicle is suddenly changed largely under a condition that a driver of the vehicle is not informed about the limitation of the driving performance. Accordingly, the driver has a feeling of strangeness, and is dissatisfied.

In JP-A-2006-113892, electric power consumption of multiple electric devices mounted on the vehicle is not considered. Accordingly, when the electric power consumption of an in-vehicle electric device is large, the driver may not be able to drive the vehicle to the charge place. Further, if usage of the in-vehicle electric device is restricted, a function provided by the in-vehicle electric device is not obtained, so that passenger comfort and convenience are not provided. Thus, the passenger in the vehicle may have a feeling of strangeness, and is dissatisfied.

The above difficulties may occur at a vehicle having an energy source obtained from fuel such as gasoline, in addition to an electric vehicle having an energy source obtained from electric power of a battery.

SUMMARY

In view of the above-described problem, it is an object of the present disclosure to provide an in-vehicle controller for controlling reduction of driving energy of a vehicle so that a function of the vehicle is largely reduced, and a maximum cruising range is extended after the in-vehicle controller informs a driver of the vehicle about a limitation of a function of the vehicle.

According to an aspect of the present disclosure, a control device for a vehicle includes: a plurality of controllers, each of which executes a plurality of energy saving control modes for restricting reduction of driving energy of the vehicle; a selector for displaying the plurality of energy saving control modes at the same time and for prompting an user of the vehicle to select execution or rejection of one of the plurality of energy saving control modes; and a central control device for controlling one of the plurality of controllers to execute a corresponding energy saving control mode, of which the execution is selected by the user, so that a maximum cruising range of the vehicle is expanded.

The above control device informs the user of the energy saving control modes for restricting reduction of driving energy of the vehicle. Thus, the user recognizes a feeling of discomfort and reduction of convenience, which are caused by execution of the energy saving control modes. As a result, since the user recognizes the limitation of the functions of the vehicle, the user can admit large limitation of the functions, so that the maximum cruising range of the vehicle is expanded.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram showing a driving history in the in-vehicle device according to the first embodiment.

DETAILED DESCRIPTION

First Embodiment

Figure 1:
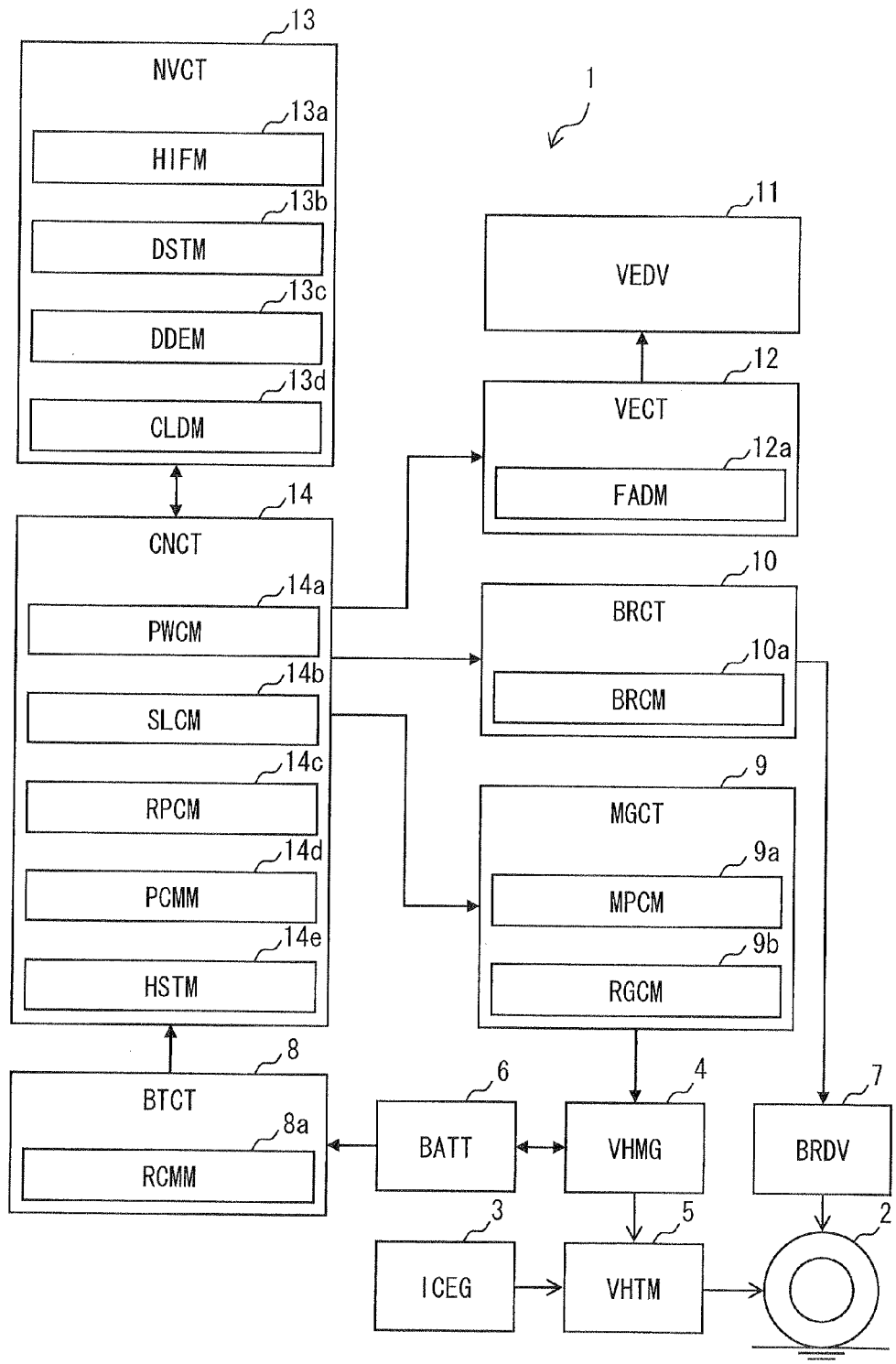
FIG. 1 is a block diagram showing an in-vehicle device according to a first embodiment.

FIG. 1 shows an in-vehicle control device 1 according to a present embodiment. A vehicle includes both of an internal combustion engine (i.e., ICEG) 3 and a rotating electric machine as a vehicle motor generator (i.e., VHMG) 4 as a power source for driving the vehicle. In this case, the vehicle is defined as a hybrid vehicle or electric vehicle. With using only the internal combustion engine 3, only the rotating electric machine 4, or both of the internal combustion engine 3 and the rotating electric machine 4, a drive wheel 2 is driven so that the vehicle runs. The power of the internal combustion engine 3 and/or the power of the rotating electric machine 4 are transmitted to the drive wheel 2 via an automatic transmission (i.e., VHTM) 5. The rotating electric machine 4 is a motor generator so that the rotating electric machine 4 functions as a motor and/or a generator.

A battery 6 for driving the vehicle is mounted on the vehicle, and the battery 6 supplies electricity to the rotating electric machine 4. The battery 6 is a secondary battery such as a lithium ion battery. The battery 6 supplies electricity to the rotating electric machine 4, and is charged by electricity, which is generated at the rotating electric machine 4. The battery 6 is a high voltage battery for supplying power of driving the vehicle so that the battery 6 supplies electricity having a voltage of a few hundred volts.

A brake device (i.e., BRDV) 7 for braking rotation of wheels of the vehicle including the drive wheel 2 is mounted on the vehicle. The brake device 7 brakes the rotation of the wheels in association with electric braking force, which is obtained in a case where the rotating electric machine 4 functions as a generator.

The in-vehicle control device 1 includes multiple controllers. Each controller includes a micro computer having a storage medium, which is readable by the computer. The storage medium stores a program, which is readable by the computer. The storage medium may be a memory device. The program is executed by the controller so that the controller functions as the in-vehicle control device 1 and executes a controlling method. A function provided by the controller may be referred to as a function block or a module for satisfying a predetermined function.

Further, the controllers may be integrated into one body so that multiple functions are executed by one piece of a hardware. Alternatively, each controller may be integrated into an object device, which is controlled by the controller. For example, a battery controller (i.e., BTCT) 8 may be integrated into the battery 6.

The in-vehicle control device 1 includes the battery controller 8. The battery controller 8 monitors a charge state and a discharge state of the battery 6. Further, the battery controller 8 controls a parameter such as a temperature, a charge current and a discharge current of the battery 6 so that the battery 6 delivers a predetermined performance. The battery controller 8 includes a remaining charge measurement device (i.e., RCMM) 8*a* for measuring a remaining battery charge (i.e., residual electric amount), which represents electricity capable of being supplied by the battery 6 and residual electricity in the battery 6. The remaining charge measurement device 8*a* measures the residual electricity in the battery 6 and outputs a signal showing the residual electricity.

The in-vehicle control device 1 includes a rotating electric machine controller as a motor generator controller (i.e., MGCT) 9. The rotating electric machine controller 9 controls a driving state of the vehicle via the rotating electric machine 4. Specifically, the rotating electric machine controller 9 controls the rotating electric machine 4 to put the vehicle into a predetermined driving state.

The rotating electric machine controller 9 includes an output power control device as a motor power control device (i.e., MPCM) 9*a* for controlling an output power of the rotating electric machine 4, which functions as the electric motor. The output power control device 9*a* provides multiple control modes including a driving priority mode and an electric power saving mode. In the driving priority mode, the output power control device 9*a* does not limit a performance of the vehicle such as an acceleration performance, and controls the rotating electric machine 4 to consume sufficient electric power when the rotating electric machine 4 drives the drive wheel 2. In the electric power saving mode, the output power control device 9*a* largely limits a performance of the vehicle such as an acceleration performance, and controls the rotating electric machine 4 to reduce the electric power consumption rather than the driving priority mode when the rotating electric machine 4 drives the drive wheel 2. In the electric power saving mode, the reduction of the remaining electric power amount in the battery 6 is restricted, so that a maximum cruising range is extended. The limitation of functions of the vehicle in the electric power saving mode is very large, so that the driver clearly realizes the change of the state and the behavior of the vehicle. The electric power saving mode is one of energy saving control modes. The controller shows these energy saving control modes to the driver, and the driver selects at least one of the control modes.

The rotating electric machine controller 9 further includes a regeneration control device (i.e., RGCM) 9*b* for controlling a regeneration electric power amount, which is a generated electric amount when the rotating electric machine 4 functions as a generator. The regeneration control device provides multiple control modes including a normal mode and a regeneration priority mode. In the normal mode, the rotating electric machine controller 9 equally uses both of the rotating electric machine 4 and the brake device 7 to reduce the vehicle speed when the drive wheel 2 drives, i.e., rotates the rotating electric machine controller 9. In the regeneration priority mode, the rotating electric machine controller 9 uses the rotating electric machine 4 a lot compared with the normal mode to reduce the vehicle speed when the drive wheel 2 drives the rotating electric machine controller 9. In the regeneration priority mode, the amount of charge to the battery 6 is increased so that reduction of the remaining amount of electric energy in the battery 6 is restricted. Thus, a maximum cruising range is extended. A limitation of functions in the regeneration priority mode is comparatively large so that the driver of the vehicle clearly recognizes the change of behavior and state in each part of the vehicle. The regeneration priority mode is one of energy saving control modes. These energy saving control modes are provided by the in-vehicle control device 1, and the driver selects at least one of the control modes.

The in-vehicle control device 1 further includes a brake controller (i.e., BRCT) 10. The brake controller 10 includes a braking force control device (i.e., BRCM) 10*a* for controlling the brake device 7 to generate a certain braking force.

The regeneration control device 9*b* and the braking force control device 10*a* cooperate with each other and work together so that they provide a brake control device. The regeneration control device 9*b* and the braking force control device 10*a* control a ratio between the braking force of the rotating electric machine 4, which is applied to the wheels of the vehicle, and the braking force of the brake device 7, which is applied to the wheels. For example, the regeneration control device 9*b* and the braking force control device 10*a* function together so that the normal mode and the regeneration priority mode are provided. In the normal mode, the rotating electric machine 4 and the brake device 7 apply the braking force to the wheels with a certain ratio between the braking force of the rotating electric machine 4 and the braking force of the brake device 7, which provides a preferable speed reduction feel when the driver operates the brake pedal. In the regeneration priority mode, a ratio of the braking force between rotating electric machine 4 and the brake device 7 is set in order to prioritize the regenerated electric power over the preferable speed reduction feel. These control modes are provided by the in-vehicle control device 1, and the driver selects at least one of the control modes.

Further, multiple in-vehicle electric devices (i.e., VEDV) 11 are mounted on the vehicle. The in-vehicle electric devices 11 include an interior light of the vehicle, an air conditioning device, an audio device and the like. Even when the function of each in-vehicle electric device 11 is restricted, the restriction does not affect directly the driving performance of the vehicle. Thus, the in-vehicle electric devices 11 are defined as additional devices. The restriction of the function of each in-vehicle electric device 11 is performed by stopping the function, i.e., by limiting the function completely. Alternatively, the restriction of the function of each additional in-vehicle electric device 11 may be performed by stopping the function partially or by narrowing an operation range, i.e., by limiting the function partially. The functions of the internal combustion engine 3, the rotating electric machine 4, and the automatic transmission 5 may be performed by the in-vehicle electric device 11. When the function of each of the internal combustion engine 3, the rotating electric machine 4, and the automatic transmission 5 is limited, the limitation of the function affects directly the driving performance of the vehicle. Thus, the internal combustion engine 3, the rotating electric machine 4, and the automatic transmission 5 are defined as a fundamental device for the vehicle. The restriction of the function of each of the fundamental devices is performed by stopping the function partially or by narrowing an operation range, i.e., by limiting the function partially.

The in-vehicle control device 1 further includes an in-vehicle electric device controller (i.e., VECT) 12 for controlling each in-vehicle electric device 11. The in-vehicle electric device controller 12 includes a function adjusting device (i.e., FADM) 12a for adjusting a functional output of a corresponding in-vehicle electric device 11. The function adjusting device 12a provides a normal mode for controlling the in-vehicle electric device 11 to perform a predetermined function and multiple control modes including a restriction mode for controlling the in-vehicle electric device 11 to restrict the function partially or to restrict the function completely. In the restriction mode, the reduction of the remaining amount of electric energy in the battery 6 is restricted, so that the maximum cruising range is extended. The restriction mode is one of energy saving control modes. These energy saving control modes are provided by the in-vehicle control device 1, and the driver selects at least one of the control modes.

Thus, the in-vehicle control device 1 includes multiple controllers 9, 10, 12 for performing multiple energy saving control modes, which provide to limit the reduction of the energy for driving the vehicle.

The in-vehicle control device 1 further includes a navigation control device (i.e., NVCT) 13 mounted on the vehicle. The navigation control device 13 includes a human interface device (i.e., HIFM) 13a as an input/output device. The human interface device 13a includes a display device as a display element for displaying information and a touch panel as an input element for inputting an instruction from the driver or the user. The navigation control device 13 further includes a destination setting device (i.e., DSTM) 13b for setting a destination of the next drive and a driving distance estimation device (i.e., DSTM) 13c for estimating a driving distance from a current position to the destination. Further, the navigation control device 13 includes a clock device (i.e., CLDM) 13d for presenting time information including information about current time and day of the week.

The in-vehicle control device 1 further includes a central controller (i.e., CNCT) 14 for controlling multiple control modes intensively, which are provided by multiple controllers 9, 10, 12 according to the selection of the user. The central controller 14 controls each of the controllers 9, 10, 12 according to the energy saving control mode, which is selected by the user of the vehicle.

The central controller 14 includes an electric power control device (i.e., PWCM) 14a. The electric power control device 14a controls each of the controllers 9, 10, 12 to function in the energy saving control mode, which is selected by the user. According to the instruction signal from the electric power control device 14a, each controller 9, 10, 12 switches the control mode from a current control mode to the energy saving control mode so as to extend the maximum cruising range. In the energy saving control mode, the reduction of the remaining amount of electric energy in the battery 6 is restricted, so that the maximum cruising range is extended. In the energy saving control mode, the state and the behavior of the vehicle are largely changed so that the driver clearly realizes the change of the state and the behavior of the vehicle. Thus, the state and/or the behavior of the vehicle are clearly changed before and after each controller 9, 10, 12 switches to the energy saving control mode. Specifically, when the controller 9, 10, 12 functions in the energy saving control mode, the function is largely restricted so that the reduction of the remaining amount of electric energy in the battery 6 is restricted. Specifically, the change of the state and/or the behavior of the vehicle provide to damage comfort and convenience for the user. Even when the controller 9, 10, 12 functions in the energy saving control mode, which is not preferable for the user, the user in the vehicle does not have a feeling of strangeness, and is not dissatisfied because the user selects the energy saving control mode.

The central controller 14 further includes a selection control device (i.e., SLCM) 14b. The selection control device 14b presents the energy saving control modes, which are selectable for the user. Further, the selection control device 14b inputs a selection operation of the user. The selection control device 14b displays multiple energy saving control modes, which are selectable, on one selection screen image at the same time after the user turns on the vehicle. The selection control device 14b controls the human interface device 13a to display the energy saving control modes and to input the selection operation of the user. Thus, the user can recognize the selected energy saving control mode and the function limitation of the selected energy saving control mode. The selection control device 14b further presents the energy saving result in each energy saving control mode. Thus, the user can recognize the energy saving result according to the function limitation in the energy saving control mode. The selection control device 14b requires the user to select at least one of the energy saving control modes or not to select the energy saving control modes. Thus, the user recognizes clearly the function limitation.

The energy saving control modes presented by the selection control device 14b includes the following modes. For example, in one of the modes, the electric power supply to the additional electric devices, which are not necessary to drive the vehicle, such as an air conditioning device and/or an audio device in the vehicle. In this case, the central controller 14 transmits a request signal for stopping a function of a corresponding electric device 11 to a respective controller 12 of the electric device 11 so that the corresponding electric device 11 stops functioning. In another one of the modes, the driving force output from the rotating electric machine 4 is reduced so that the electric power consumption is limited. In this case, the central controller 14 transmits a request signal for limiting the driving force, to the rotating electric machine controller 9 so that the driving force output from the rotating electric machine 4 is reduced. In another one of the modes, the regeneration electric power, in a case where the vehicle speed is reduced, is increased so that the charge amount of the electric power to the battery 6 is increased. Accordingly, the central controller 14 transmits a request signal for reducing the braking ratio of the brake device 7 and for increasing the braking ratio of the rotating electric machine 4, to the rotating electric machine controller 9 and the brake controller 10. Here, when the rotating electric machine 4 functions as a generator, the rotating electric machine 4 provides the braking force. Thus, the regeneration electric power is increased. In another one of the modes, the central controller 14 transmits a request signal to the rotating electric machine controller 9 so that the rotating electric machine controller 9 controls the rotating electric machine 4 to switch to the energy saving control mode automatically according to a specific selection by the user. For example, a high regeneration shift range for increasing the regeneration electric power may be prepared. The user can operate the shift lever to switch to the high regeneration shift range. In this case, when a predetermined driving condition such as a down slope is detected, the central controller 4 switches to the energy saving control mode automatically.

In the above modes, the reduction of the remaining amount of electric energy in the battery 6 is restricted although the comfort and convenience for the user are reduced. The selection control device 14b requires the user to select one of a situation that the comfort and convenience for the user are reduced and a situation that the maximum cruising range is extended. Thus, the user preliminary recognizes the disadvantages of the restriction of the reduction of the remaining amount of electric energy in the battery 6, which provides the increase of the maximum cruising range. As a result, the user accepts the disadvantages of requirement for reaching the destination.

The central controller 14 further includes a remaining electric power determination device (i.e., RPCM) 14c for determining the remaining amount of the electric power. The remaining electric power determination device 14c inputs data from the battery controller 8, the data showing the remaining amount of the electric power in the battery 6.

Further, the central controller 14 includes a comparison process device (i.e., PCMM) 14d. The comparison process device 14d determines based on the maximum cruising range and the driving distance to the destination whether a possibility for reaching the destination is higher than a predetermined value. For example, the comparison process device 14d compares the maximum cruising range with the driving distance to the destination whether the possibility for reaching the destination is higher than the predetermined value. The maximum cruising range of the vehicle is calculated according to the remaining energy for driving the vehicle. Here, the vehicle is capable of running within the maximum cruising range. The driving distance to the destination is estimated by the driving distance estimation device 13c in the navigation control device 13. The central controller 14 requires the user to select at least one of the energy saving control modes only when the possibility for arriving at the destination is low. For example, when the remaining electric power in the battery 6 is equal to or smaller than the predetermined value, or when the central controller 14 determines based on the remaining electric power and the distance to the destination that the vehicle cannot reach the destination, the central controller 14 requires the user to select at least one of methods for restricting the reduction of the remaining electric power.

Further, the central controller 14 includes a driving record storing device (i.e., HSTM) 14e for storing the driving record of the vehicle and for setting the destination automatically based on the stored driving record. The driving record storing device 14e includes a memory for storing information about the driving record as a driving history.

Figure 2:
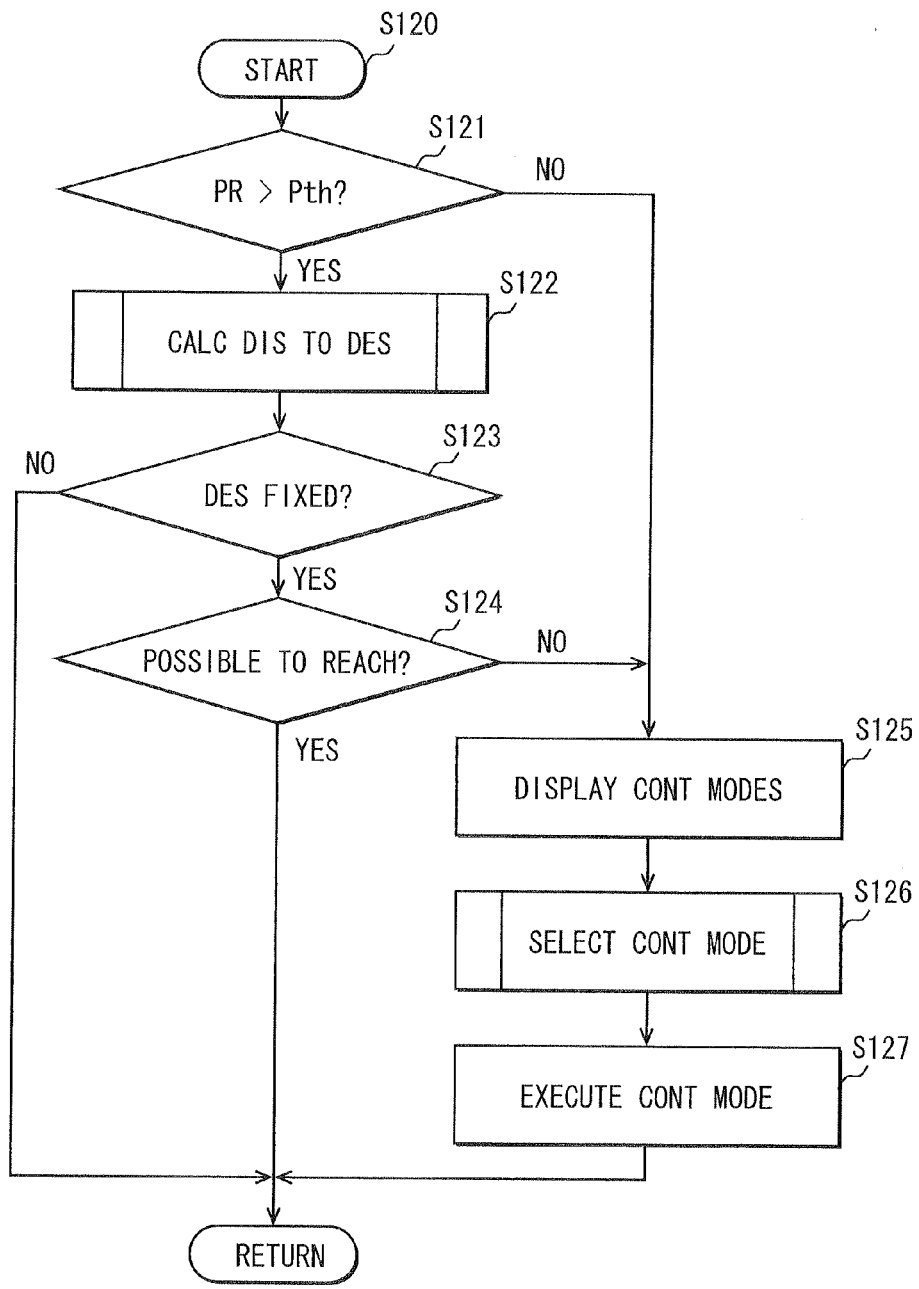
FIG. 2 is a flowchart showing an operation of the in-vehicle device according to the first embodiment.

FIG. 2 shows a flowchart of an operation of the in-vehicle control device 1. The in-vehicle control device 1 executes an electric power control process S120 in the central controller 14. The electric power control process S120 is performed in response to the activation of the vehicle, which is executed by a turn-on operation of an electric power switch of the vehicle.

In step S121, the central controller 14 determines whether the remaining electric power PR in the battery 6 detected by the remaining charge measurement device 8a is larger than a predetermined threshold Pth. The predetermined threshold Pth is set to be smaller than a maximum amount of electric power in the battery 6, which is a new battery and not deteriorated. Here, the new battery 6 can be fully charged up to the maximum amount of electric power. Further, the predetermined threshold Pth is set to be an electric power for driving the minimum distance. When the remaining electric power PR in the battery 6 is smaller than the predetermined threshold Pth, it proceeds to step S125. When the remaining electric power PR in the battery 6 is larger than the predetermined threshold Pth, it proceeds to step S122. In step S122, the central controller 14 calculates the distance to the destination. In step S123, the central controller 14 determines whether the destination is fixed. When the destination is not fixed, the electric power control process S120 ends. When the destination is fixed, it goes to step S124. In step S124, the central controller 14 determines whether the vehicle can arrive at the destination with using the remaining electric power. Here, in view of all of electric power consumption in all electric loads including the electric devices 11 mounted on the vehicle and the rotating electric machine 4, the central controller 14 determines whether the vehicle can arrive at the destination. When the central controller 14 determines that the vehicle can arrive at the destination, the electric power control process S120 ends. When the central controller 14 determines that the vehicle can not arrive at the destination, it goes to step S125. In steps S121-S124, the central controller 14 provides a determination element for determining whether the remaining electric power as the remaining energy for driving the vehicle is smaller than the predetermined value. The determination element provides step S121. Specifically, the determination element includes a first determination element for determining whether the vehicle can run a predetermined fixed distance. Here, in this case, the predetermined value is defined as energy necessary for running the predetermined fixed distance. Further, the determination element provides steps S122 and S124. Specifically, the determination element includes a second determination element for determining whether the vehicle can reach the destination. Here, in this case, the predetermined value is defined as energy necessary for reaching the destination. In step S125, the central controller 14 presents multiple methods for restricting the reduction of the remaining amount of electric energy in the battery 6.

Figure 3:
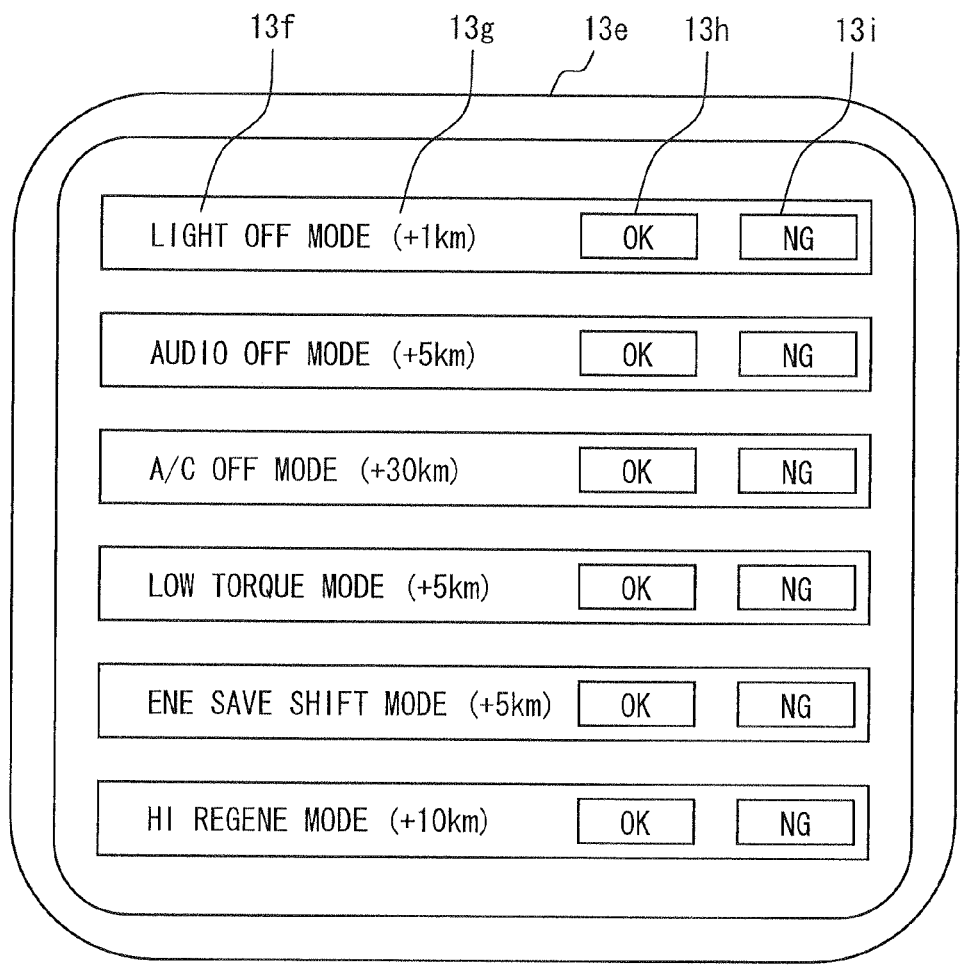
FIG. 3 is a diagram showing a plan view of a display device in the in-vehicle device according to the first embodiment.

FIG. 3 shows a plan view of the display device 13e in the in-vehicle control device 1. The display device 13e in the human interface device 13a is a liquid crystal display element. In step S125, the display device 13e displays multiple energy saving control modes 13f for restricting the reduction of the remaining electric power. For example, the energy saving control modes includes a mode for turning off a vehicle interior light, a mode for turning off an audio device, a mode for turning off an air conditioning device, a mode for maintaining a low torque driving condition, a mode for switching to an energy saving shift range, and a mode for maximizing regeneration electric power.

In the energy saving control mode corresponding to the mode for turning off the vehicle interior light, the electric power supply to the interior light is interrupted. In the energy saving control mode corresponding to the mode for turning off the audio device, the electric power supply to the audio device is interrupted. In the energy saving control mode corresponding to the mode for turning off the air conditioning device, the electric power supply to the air conditioning device is interrupted.

In the energy saving control mode corresponding to the mode for maintaining the low torque driving condition, the rotating electric machine 4 is controlled to limit the output torque from the rotating electric machine 4 so that the electric power consumption in the rotating electric machine 4 is reduced. The mode for maintaining the low torque driving condition is defined as a low torque control mode.

In the energy saving control mode corresponding to the mode for switching to the energy saving shift range, the shift range of the vehicle is automatically switched to the energy saving shift range so that the electric power consumption is minimized. For example, in this mode, when a predetermined driving condition such as a down slope of a road is detected by the central controller 14, the shift range is automatically switched to the high regeneration shift range so that the regeneration electric power increases. In this case, since the amount of charge to the battery 6 increases according to the increase of the regeneration electric power, the reduction of the remaining amount of electric energy in the battery 6 is restricted. The mode for switching to the energy saving shift range is defined as an energy saving shift range control mode.

In the energy saving control mode corresponding to the mode for maximizing regeneration electric power, the ratio of the braking force by the brake device 7 is reduced, and the ratio of the braking force by the rotating electric machine 4 increases so that the regeneration electric power is maximized. Here, the braking force by the rotating electric machine 4 is defined as the regeneration brake. For example, in the mode for maximizing regeneration electric power, the speed range of the vehicle, in which the regeneration brake is performed, is expanded. The mode for maximizing regeneration electric power is defined as a high regeneration electric power control mode corresponding to the regeneration priority mode.

As shown in FIG. 3, the increase distance 13g of the maximum cruising range in each energy saving control mode is displayed on the display device 13e. The increase distance 13g is an effect when the energy saving control mode is selected. For example, the increase distance 13g is +1 km, +5 km or +30 km.

Further, a button image 13h, 13i for inputting "OK" as acceptance or "NG" as rejection of a corresponding energy saving control mode is displayed. When the user selects the button image 13h, the corresponding energy saving control mode is executed. When the user selects the button image 13i, the corresponding energy saving control mode is not executed. When the user does not select both of the button images 13h, 13i, the corresponding energy saving control mode is not executed. When the user touches one of the button images 13h, 13i with a finger, a touch panel of the display device 13e detects the finger of the user so that the selection of the one of the button images 13h, 13i is input.

In step S126 in FIG. 2, the selected operation of the user is input, and the energy saving control mode is determined. In steps S125, S126, the central controller 14 provides a selection control device for displaying multiple energy saving control modes at the same time and for inputting an execution or rejection instruction in each energy saving control mode from the user. Specifically, in steps S125, S126, when the central controller 14 determines in steps S121-S124 that the remaining amount of the energy for driving the vehicle is smaller than the predetermined value, multiple energy saving control modes are displayed, and the user selects the execution or rejection of each energy saving control mode. In step S127, the selected energy saving control mode is executed. Thus, the energy saving control mode selected by the user is executed. In step S127, the central controller 14 provides a control element for controlling multiple controllers 9, 10, 12 to execute the selected energy saving control mode, which is selected by the user through the selection control device, so that the maximum cruising range is extended.

Figure 4:
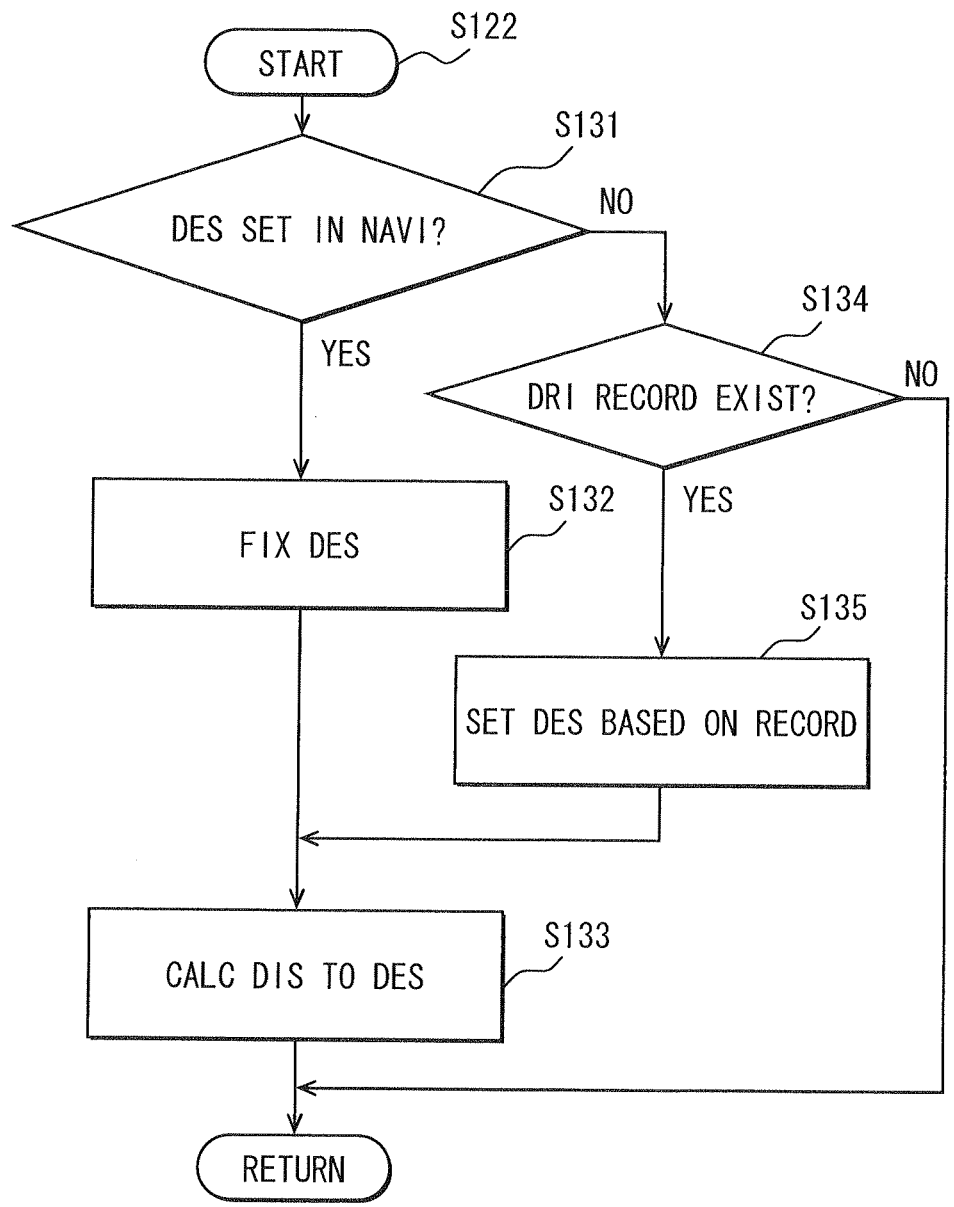
FIG. 4 is a flowchart showing an operation of the in-vehicle device according to the first embodiment.

FIG. 4 shows a flowchart of an operation of the in-vehicle device. Specifically, FIG. 4 shows the distance calculation process in step S122. In step S131, the central controller 14 determines whether the user sets the destination in the navigation control device 13. When the user sets the destination in the navigation control device 13, it goes to step S132. In step S132, the destination set in the navigation control device 13 is fixed. In step S133, the central controller 14 calculates the distance from the current point to the destination with using the navigation control device 13. The navigation control device 13 provides steps S132 and S133. Specifically, in steps S132 and S133, the navigation control device 13 provides a driving distance calculation element for calculating the estimated driving distance to the destination, which is set in the navigation control device 13.

When the destination is not set in the navigation control device 13, it goes to step S134. In step S134, the driving record is searched. Specifically, in step S134, the central controller 14 determines whether there is the driving record corresponding to a day of the week and a time zone, at which the vehicle is activated. The day of the week and the time zone are obtained from time information from the clock device 13d. For example, the time zone has a width of two hours and a base point of zero hour. When no driving record exists, the distance calculation process in step S122 ends without calculating the distance since it is impossible to set the destination. When the driving record exists, it goes to step S135. In step S135, the destination set from the driving record is fixed. In step S133, the distance to the destination is calculated based on the driving record. In steps S134 and S135, the central controller 14 provides a driving distance calculation element for calculating the estimated driving distance to the destination, which is automatically set according to the driving record, even when the destination is not set in the navigation control device 13.

In the present embodiment, the destination is set in the navigation control device 13 mounted on the vehicle or set according to the driving record.

Figure 5:
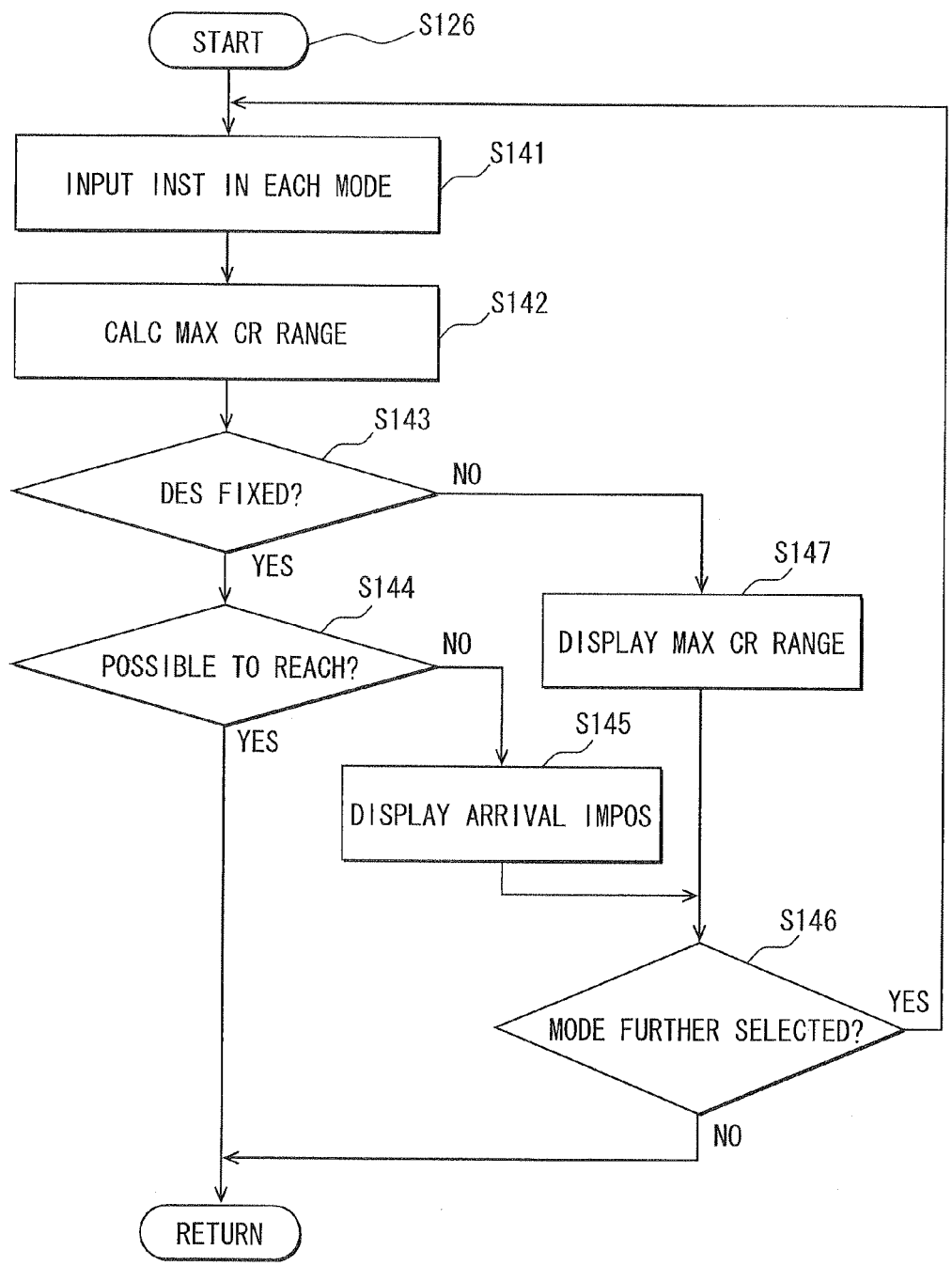
FIG. 5 is a flowchart showing an operation of the in-vehicle device according to the first embodiment.

FIG. 5 is a flowchart showing an operation of the in-vehicle device. Specifically, FIG. 5 shows a selection input process in step S126.

In step S141, the user inputs the selection operation with using the human interface device 13a. Here, in step S141, the user inputs one of the execution instruction and the rejection instruction in each energy saving control mode. In step S142, the maximum cruising range is calculated again in a case where the selected energy saving control mode is executed. In step S143, the central controller 14 determines whether the destination is fixed. When the destination is fixed, it goes to step S144. In step S144, the central controller 14 determines whether it is possible to arrive at the destination with using the remaining electric power in the battery 6. Steps S143 and S144 correspond to steps S123 and S124. When the central controller 14 determines that the vehicle can reach the destination, the selection input process in step S126 ends. When the central controller 14 determines that the vehicle can not reach the destination, it goes to step S145. In step S145, the central controller 14 controls the display device in the human interface device 13a to display a message (i.e., a message of arrival impossibility) such that the vehicle can not reach the destination. Thus, the in-vehicle control device 1 notifies the user that the vehicle can not reach the destination. Further, in step S145, the energy saving control modes for restricting the reduction of the remaining electric power are displayed again, and another button image for selecting additional energy saving control modes is displayed. Specifically, in step S145, the central controller 14 requests the user to determine whether the energy saving control modes for restricting the reduction of the remaining electric power are additionally selected. In step S146, the central controller 14 determines based on a signal from the human interface device 13a whether the user selects the energy saving control modes. When the user further selects the energy saving control modes, it returns to step S141. When the user does not further select the energy saving control modes, the election input process in step S126 ends.

In step S143, when the destination is not fixed, it goes to step S147. In step S147, the central controller 14 controls the display device in the human interface device 13a to display the maximum cruising range with using the remaining electric power in the battery 6. Further, in step S147, the energy saving control modes for restricting the reduction of the remaining electric power are displayed again, and another button image for selecting additional energy saving control modes is displayed. Specifically, in step S147, the central controller 14 requests the user to decide whether the maximum cruising range is sufficient. Furthermore, in step S147, the central controller 14 requests the user to determine whether the energy saving control modes for restricting the reduction of the remaining electric power are additionally selected. In step S146, the central controller 14 determines based on a signal from the human interface device 13a whether the user selects the energy saving control modes. When the user further selects the energy saving control modes, it returns to step S141. When the user does not further select the energy saving control modes, the election input process in step S126 ends.

Figure 6:
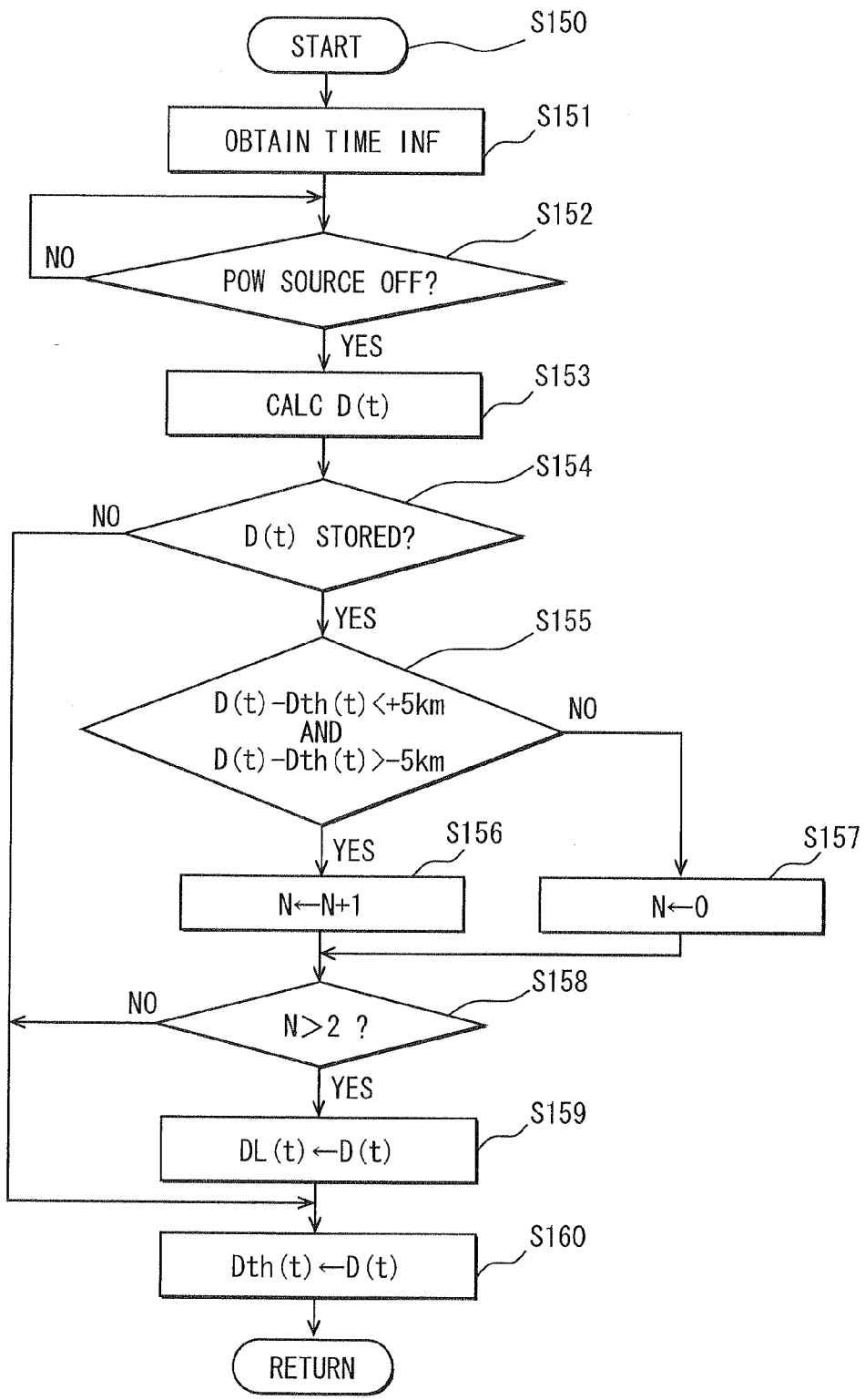
FIG. 6 is a flowchart showing an operation of the in-vehicle device according to the first embodiment.

FIG. 6 is a flowchart showing an operation of the in-vehicle device. FIG. 6 shows a driving record storing process S150, which is executed by the central controller 14. In the driving record storing process S150, the usual driving distance of the vehicle is stored, so that the driving record storing process S150 is defined as a learning process. The central controller 14 provides a driving record storing element 14e in the driving record storing process S150.

In step S151, when the power source of the vehicle turns on, time information (t) at the activation time of the vehicle is obtained by the clock device 13d. In step S152, the central controller 14 determines whether the power source of the vehicle turns off, i.e., whether the operation of the vehicle stops. The determination in step S152 is repeatedly performed until the power source of the vehicle turns off. When the power source of the vehicle turns off, it goes to step S153. In step S153, the central controller 14 calculates the driving distance D(t), which the vehicle actually runs from the power-on time to the power-off time. In step S154, the central controller 14 determines whether a threshold distance Dth corresponding to the time information (t) obtained in step S151 is stored. The threshold distance Dth provides a threshold for determining whether the driving record is updated. When the threshold distance Dth is not stored, it goes to step S160. In step S160, the current driving distance D(t) is stored as the threshold distance Dth. When the threshold distance Dth is stored, it goes to step S155.

In step S155, the current driving distance D(t) is compared with the threshold distance Dth(t) so that the central controller 14 determines whether the current driving distance D(t) can be defined as the usual driving distance of the vehicle. Specifically, in step S155, the central controller 14 determines whether the difference between the current driving distance D(t) and the threshold distance Dth(t) is within an error range. Here, the error range is, for example, 5 km. In step S155, when a condition of "D(t)−Dth(t)<+5 km" and a condition of "D(t)−Dth(t)<−5 km" are met, it goes to step S156. In this case, the possibility that the current driving distance corresponds to the usual driving distance provided by the threshold distance is high. In step S156, an index of coincidence us defined as a count N, and the counter item N is switched to N+1. Specifically, the central controller 14 adds one to the current counter item N. When the condition in step S155 is not satisfied, it goes to step S157. In this case, the possibility that the current driving distance does not correspond to the usual driving distance provided by the threshold distance is high. In step S157, the counter item N is reset. Specifically, the central controller 14 sets the current counter item N to be zero. In step S158, the central controller 14 determines whether the index of coincidence exceeds a predetermined value. Here, in step S158, the predetermined value is two. Specifically, the central controller 14 determines whether the index of coincidence is equal to or larger than three. When the index of coincidence does not exceed the predetermined value, it goes to step S160. When the index of coincidence exceeds the predetermined value, it goes to step S159. In this case, the current driving distance is the usual driving distance. In step S159, the current driving distance D(t) is stored as the driving record DL(t). When the previous driving record DL(t) exists, the previous driving record DL(t) is updated to the current driving record DL(t).

In step S160, the threshold distance Dth(t) is updated. Specifically, the current driving distance D(t) is stored as the threshold distance Dth(t), which is provided from the time information (t). Thus, in the next driving time, the current driving distance D(t) is used as the threshold distance Dth(t) for determining whether the next driving distance is the usual driving distance.

FIG. 7 shows a table 14f showing a driving history in the in-vehicle device 1. An item in the table 14f is searchable based on a day of the week and the time zone. In the table 14f, the driving record DL(t), the threshold distance Dth(t) and the accumulated index N of coincidence are stored in each time zone in each day of the week.

In the present embodiment, only the usual driving time, at which the driver drives the vehicle at a specific time zone in a specific day of the week, is detected. Then, the driving record of the vehicle is stored. In steps S134 to S133 via step S135, the driving distance to the destination is calculated based on the driving record DL(t). Thus, even if the user does not set the destination, the driving distance to the estimated destination is automatically calculated based on the usual driving record.

Second Embodiment

Figure 8:
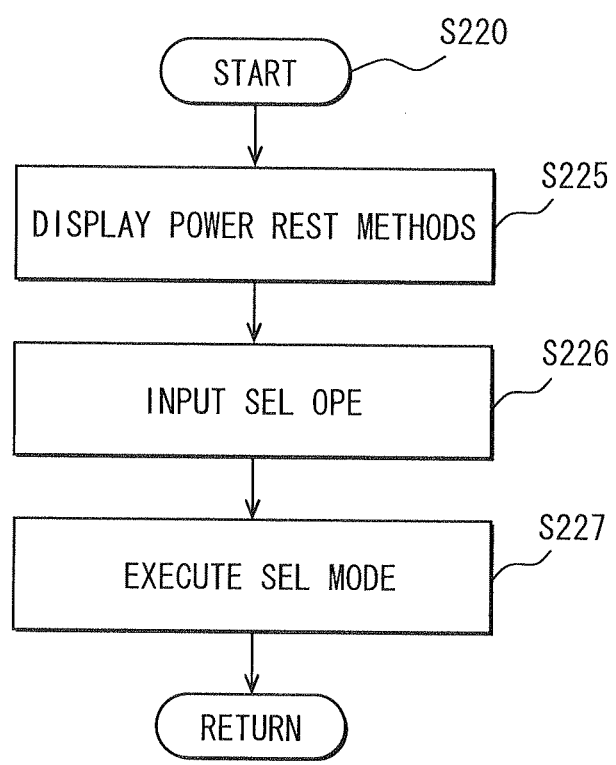
FIG. 8 is a flowchart showing an operation of an in-vehicle device according to the second embodiment.

FIG. 8 shows an operation of an in-vehicle device according to a second embodiment. In the first embodiment, when the maximum cruising range is not sufficient to reach the destination, the in-vehicle control device 1 shows the restriction methods of electric power, and the user selects the restriction methods. In the present embodiment, the in-vehicle control device 1 always shows the restriction methods of reduction of the remaining electric power without depending on the remaining electric power in the battery 6, i.e., without depending on the maximum cruising range. Further, the in-vehicle control device 1 requests the user to select the restriction methods.

In the present embodiment, the in-vehicle control device 1 is the similar construction as the first embodiment. However, the in-vehicle control device 1 according to the second embodiment does not include the elements 8a, 13b, 13c, 13d, 14c, 14d, 14e. In the present embodiment, the electric power control process S220 is executed by the central controller 14 mainly. In step S225, the central controller 14 presents the restriction methods of the electric power consumption. In step S225, a process similar to step S125 is executed. In step S226, the user inputs the selection operation into the in-vehicle control device 1 so that the energy saving control mode is determined. In the present embodiment, the recalculation process of the maximum cruising range in step S142 and the second selection process in steps S145-S147 are not performed. In step S227, the selected control mode is executed. Specifically, in step S227, the electric load is controlled according to the selected control mode. Thus, the restriction control of the electric power consumption, which is selected by the user, is performed.

Other Embodiments

In the above embodiments, the vehicle is a hybrid vehicle as an electric vehicle having an electric motor and an internal combustion engine. Alternatively, the vehicle may be an internal combustion engine vehicle having only the internal combustion engine. Alternatively, the vehicle may be a complete electric vehicle having only the rotating electric machine as an electric motor. Further, in the above embodiments, the remaining electric power in the battery 6 is measured as remaining energy for driving the vehicle. Alternatively, the remaining fuel for the internal combustion engine may be measured, and the in-vehicle control device may compare the maximum cruising range calculated from the remaining fuel with the driving distance to the destination. In these cases, the electric power consumption for the electric devices mounted on the vehicle is restricted, so that the fuel consumption in the internal combustion engine for generating the electric power is restricted. Thus, the maximum cruising range of the vehicle is expanded.

The in-vehicle control device 1 provides various functions, which are provided by only software, only hardware or a combination of the software and the hardware. For example, the in-vehicle control device 1 may be provided by an analog circuit.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A control device for a vehicle comprising:
a plurality of controllers, each of which includes a microcomputer and each of which executes a plurality of energy saving control modes for restricting reduction of driving energy of the vehicle;
a selector for displaying the plurality of energy saving control modes at the same time and for prompting an user of the vehicle to select execution or rejection of one of the plurality of energy saving control modes; and
a central control device, including a microcomputer, for controlling one of the plurality of controllers to execute a corresponding energy saving control mode, of which the execution is selected by the user, so that a maximum cruising range of the vehicle is expanded,
wherein the selector includes:
a display device that displays the plurality of energy saving control modes and an increase distance of the maximum cruising range, which is an effect in a case where one of the energy saving control modes is selected, when a remaining energy for driving the vehicle is smaller than a predetermined value;
an input device that prompts the user to select execution or rejection of one of the plurality of energy saving control modes;
a recalculation device that calculates again the maximum cruising range when a selected energy saving control mode is executed; and
a determination device that determines based on a recalculated maximum cruising range whether the user further selects another one of the energy saving control modes;
wherein the control device further comprises:
a driving record storing device form storing a driving record of the vehicle; and
a driving distance calculation element for automatically setting a destination based on the driving record when the driving record storing device stores the driving record corresponding to a day of week and a time zone, at which the vehicle is activated, and for calculating a driving distance to the destination, which is set at a current driving opportunity; and
wherein the predetermined value is an energy for driving the vehicle to reach the destination, and the predetermined value is set according to the calculated driving distance.

2. The control device according to claim 1,
wherein the energy for driving the vehicle is an electric power charged in a battery of the vehicle, and
wherein each energy saving control mode provides to restrict reduction of a remaining electric power in the battery.

3. The control device according to claim 2,
wherein each energy saving control mode provides to reduce electric power consumption in the battery, or to increase electric power to be charged in the battery so that the reduction of the remaining electric power in the battery is restricted.

4. The control device according to claim 3,
wherein the plurality of energy saving control modes include a control mode for limiting an output torque of a rotating electric machine for driving the vehicle so that the electric power consumption in the battery is reduced.

5. The control device according to claim 3,
wherein the plurality of energy saving control modes include a control mode for switching automatically to a shift range, at which a regeneration electric power regenerated by a rotating electric machine for driving the vehicle and charged in the battery is increased.

6. The control device according to claim 3,
wherein the plurality of energy saving control modes include a control mode for controlling a ratio between a braking force of a brake device of the vehicle and a braking force generated by a regeneration process of a rotating electric machine for driving the vehicle when a speed of the vehicle is reduced so that a regeneration electric power to be charged in the battery is increased.

7. The control device according to claim 1,
wherein the plurality of energy saving control modes include a control mode, which causes a large change in a behavior or state of the vehicle so that the user detects the large change.

8. The control device according to claim 1, wherein the driving distance calculation element calculates the driving distance from a current position to the destination when the destination is set in a navigation device of the vehicle.

9. The control device according to claim 1, wherein the driving record storing device stores a usual driving record of driving the vehicle at a specific time zone in a specific day of a week as the driving record of the vehicle.

10. An apparatus comprising:
- a display configured to display the plurality of energy saving control modes at the same time and to prompt a user of a vehicle to select execution or rejection of one of a plurality of energy saving control modes respectively executable by a plurality of controllers for restricting reduction of driving energy of the vehicle;
- a user interface configured to prompt the user to select execution or rejection of one of the plurality of energy saving control modes; and
- a processing system, including a microprocessor, configured to control one of the plurality of controllers to execute a corresponding energy saving control mode selected for execution by the user, so that a maximum cruising range of the vehicle is expanded;
- wherein the display is further configured to display the plurality of energy saving control modes and an increase distance of the maximum cruising range, which results from a case in which one of the energy saving control modes is selected, when a remaining energy for driving the vehicle is smaller than a predetermined value;
- wherein the processing system is further configured to:
  - calculate again the maximum cruising range when a selected energy saving control mode is executed, and determine based on a recalculated maximum cruising range whether the user further selects another one of the energy saving control modes;
  - store a driving record of the vehicle in a driving record storing device; and
  - automatically set a destination based on the driving record when the driving record storing device stores the driving record corresponding to a day of a week and a time zone, at which the vehicle is activated, and calculate a driving distance to the destination, which is set at a current driving opportunity; and
- wherein the predetermined value is an energy for driving the vehicle to reach the destination, and the predetermined value is set according to the calculated driving distance.

11. The apparatus according to claim 10,
- wherein the energy for driving the vehicle is an electric power charged in a battery of the vehicle, and
- wherein each energy saving control mode restricts reduction of a remaining electric power in the battery.

12. The apparatus according to claim 11,
- wherein each energy saving control mode reduces electric power consumption in the battery, or increases electric power to be charged in the battery so that the reduction of the remaining electric power in the battery is restricted.

13. The apparatus according to claim 12,
- wherein the plurality of energy saving control modes include a control mode for limiting an output torque of a rotating electric machine for driving the vehicle so that the electric power consumption in the battery is reduced.

14. The apparatus according to claim 12,
- wherein the plurality of energy saving control modes include a control mode for switching automatically to a shift range, at which a regeneration electric power regenerated by a rotating electric machine for driving the vehicle and charged in the battery is increased.

15. The apparatus according to claim 12,
- wherein the plurality of energy saving control modes include a control mode for controlling a ratio between a braking force of a brake device of the vehicle and a braking force generated by a regeneration process of a rotating electric machine for driving the vehicle when a speed of the vehicle is reduced so that a regeneration electric power to be charged in the battery is increased.

16. The apparatus according to claim 10,
- wherein the plurality of energy saving control modes include a control mode, which causes a large change in a behavior or state of the vehicle so that the user detects the large change.

17. The apparatus according to claim 10, wherein the processing system is further configured to calculate the driving distance from a current position to the destination when the destination is set in a navigation device of the vehicle.

18. The apparatus according to claim 10, wherein the processing system is further configured to store, in the driving record storing device, a usual driving record of driving the vehicle at a specific time zone in a specific day of a week as the driving record of the vehicle.

* * * * *